July 21, 1942.   W. A. LOCKHART   2,290,566
LENS CENTERING, MARKING, AND TESTING INSTRUMENT
Filed Dec. 20, 1938   4 Sheets-Sheet 1
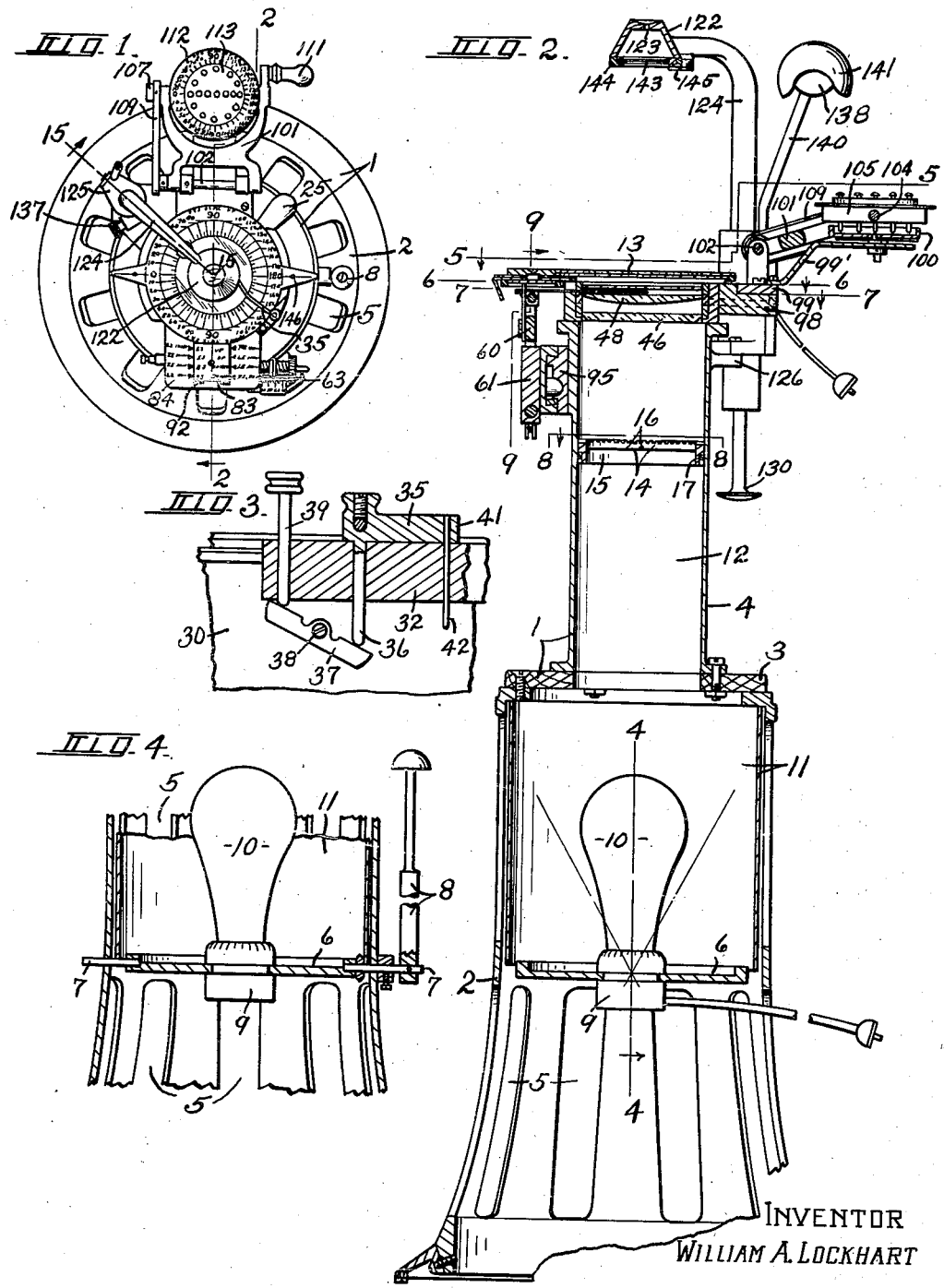
INVENTOR
WILLIAM A. LOCKHART
BY
Theodore L. Simonton
ATTORNEY

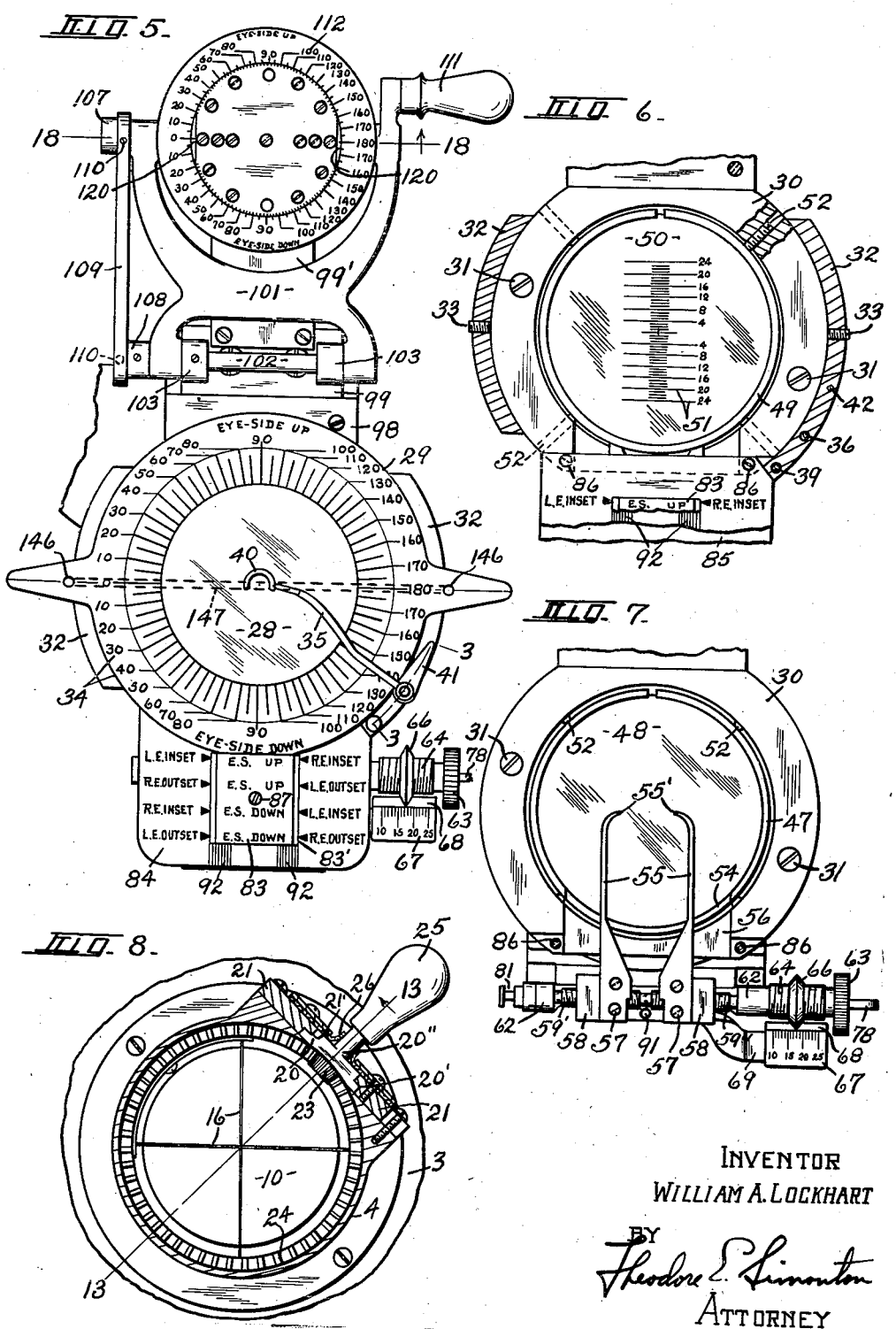

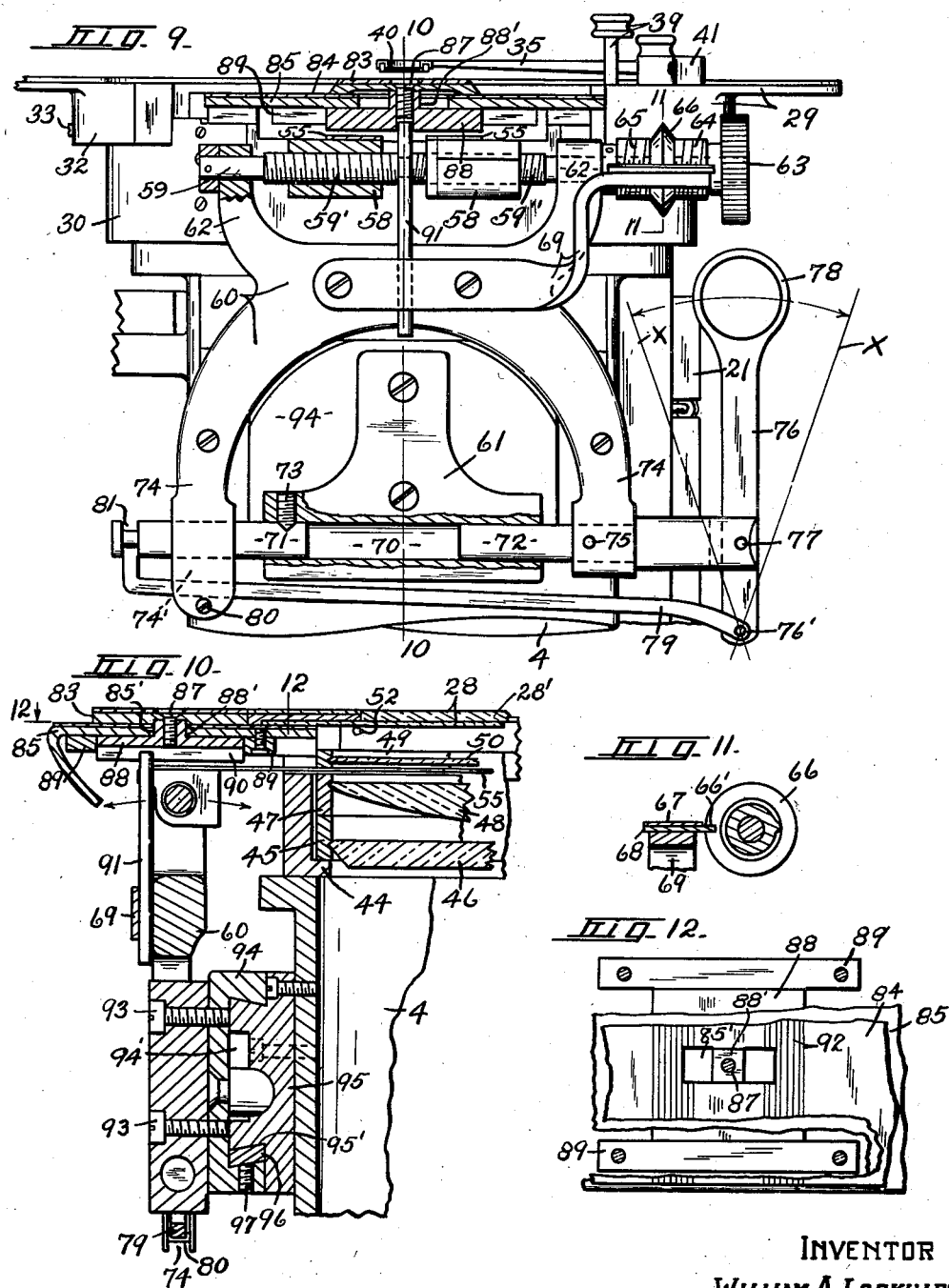
July 21, 1942. W. A. LOCKHART 2,290,566
LENS CENTERING, MARKING, AND TESTING INSTRUMENT
Filed Dec. 20, 1938   4 Sheets-Sheet 3
INVENTOR
WILLIAM A. LOCKHART
BY
Theodore L. Simonton
ATTORNEY July 21, 1942.   W. A. LOCKHART   2,290,566
LENS CENTERING, MARKING, AND TESTING INSTRUMENT
Filed Dec. 20, 1938   4 Sheets-Sheet 4
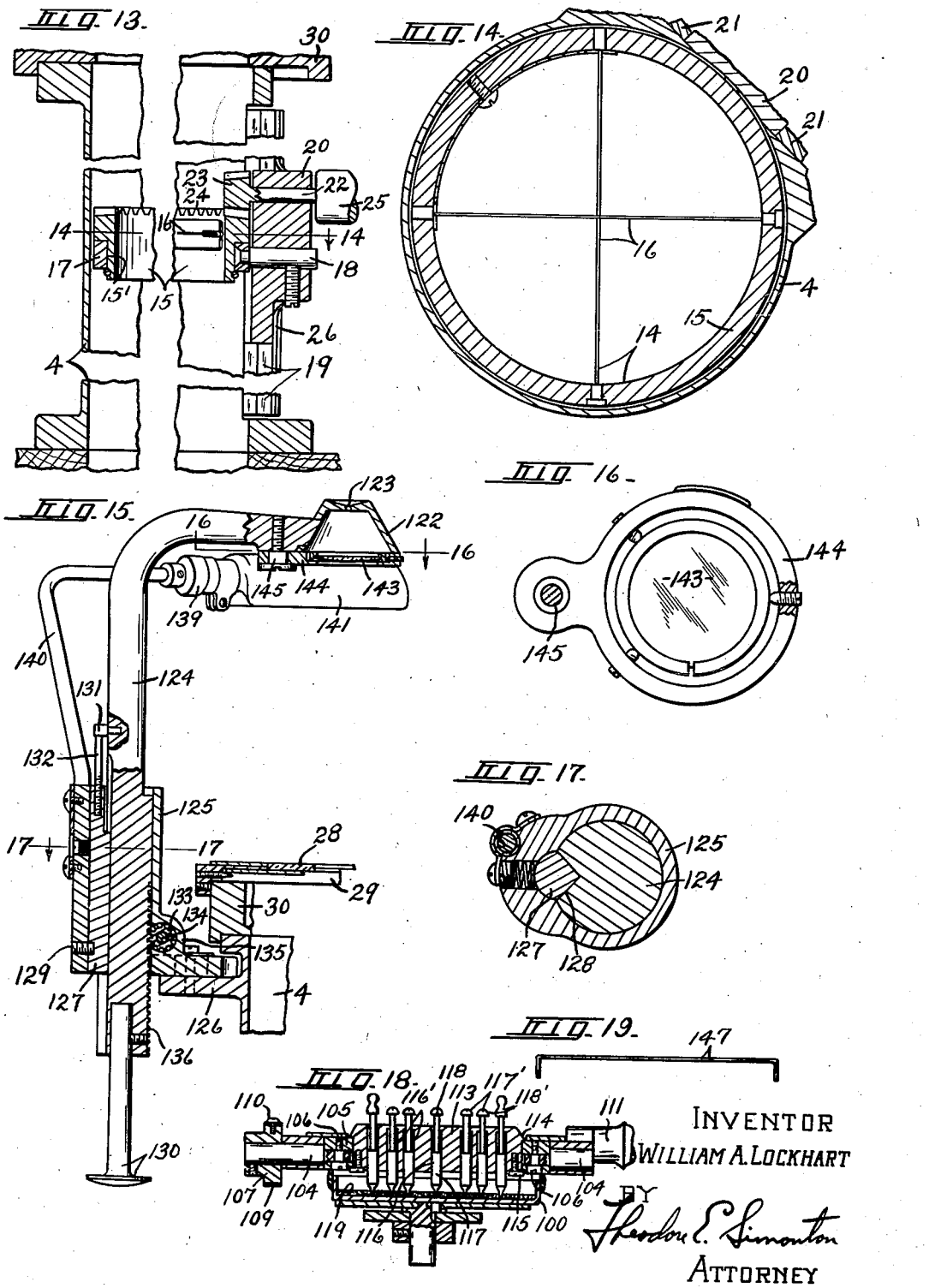
INVENTOR
WILLIAM A. LOCKHART
BY Theodore E. Simonton
ATTORNEY Patented July 21, 1942

2,290,566

UNITED STATES PATENT OFFICE 2,290,566

LENS CENTERING, MARKING, AND TESTING INSTRUMENT

William A. Lockhart, Newark, N. J., assignor to Shuron Optical Company, Inc., Geneva, N. Y., a corporation of New York Application December 20, 1938, Serial No. 246,863

6 Claims. (Cl. 88—56)

This invention relates to an instrument for marking a semi-finished lens blank and particularly for locating the relative positions of the reading section, axes and optical centers of bifocal lens blanks according to a certain prescription preparatory to finishing the lens according to other coordinated prescriptions, as may be required in the production of the lens. Also for checking the finished lens to ascertain the accuracy of the grinding and polishing operations with respect to the prescriptions and for accurately marking or inscribing the base line thereon.

The lens blank to be operated upon by this instrument is composed of suitable glass which may have a reading section or segment incorporated therein. The blank has one surface ground and polished to the contour required for the finished lens, leaving the other surface to be ground and polished to a certain prescribed contour coordinated with the previously finished contour in such manner that when the lens is cut from the blank, finished and mounted, its optical properties will conform to certain predetermined prescriptions.

An object of the invention is to provide simple and efficient means for expeditiously locating the relative positions of the reading section or segment, optical centers and axes on semi-finished lenses as they should appear on the finished lenses according to certain predetermined prescriptions, so that the marked lenses may be accurately positioned in the grinding and polishing machine for finishing the unfinished surfaces of the lenses according to the predetermined prescription.

Another object of the invention is to produce an instrument of the above mentioned class which may be utilized for testing the ground lenses to determine the accuracy of the grinding operation and also to test cut or completed lenses to check the optical axis thereof with the prescription.

A further object of the invention resides in producing an instrument which may be readily used for testing prisms as well as lenses.

More specifically, this invention contemplates the provision of an instrument for marking, centering and testing lenses, prisms or the like wherein is provided a target, a sight opening spaced from the target and a lens support mounted intermediate the sight opening and the target. The target, lens support and sight opening are arranged in alignment one with the other, the target being adjustable toward and from the lens support to adapt the same for different powered lenses.

The machine is further provided with a segment locator adjacent the lens support and movable relative thereto for indicating the position of the reading segment of a bifocal lens with respect to the center or optical axis of a semi-finished lens blank both as to the amount of drop and to the inset, or outset, of the segment.

The invention further provides an instrument of this class wherein the lens may be positioned with the eye-side thereof facing downwardly or facing upwardly and wherein the reading segment may be inset or outset with respect to the center of the lens. It also provides means whereby, when the lens is placed on the lens support, the outline of the reading segment will be visually contrasted with the remaining portions of the lens blank by the use of a source of light so placed that the light will most efficaciously pass through the segment and adjacent portion of the lens blank;

Another object is to provide means for adjusting the source of light with respect to the lens support to govern the effective amount of illumination of the target and lens;

A further object is to provide the instrument with an ink pad holder and a marker supporting carrier mounted and operated in such manner that the marker may be moved from engagement with the ink pad into engagement with the surface of the lens blank and vice versa for marking the optical center, the optical axis and the mounting line on the lens, said carrier being provided with an angularly adjustable holder having a diametrical row of marking pins adapted to be moved alternately into engagement with the inking pad and with the lens blank.

These and other objects and advantages will more fully appear from the following description taken in conjunction with the accompanying drawings, in which:

Figure 1 is a top plan of an instrument constructed in accordance with this invention.

Figure 2 is a longitudinal sectional view taken substantially on line 2—2, Figure 1, a portion of the base being broken away.

Figure 3 is a detail vertical sectonal view taken on line 3—3, Figure 5.

Figure 4 is a detail vertical sectional view taken on line 4—4, Figure 2.

Figures 5, 6, 7 and 8 are horizontal views taken, respectively, on lines 5—5, 6—6, 7—7 and 8—8, Figure 2.

Figure 9 is an enlarged detail vertical view, partly in section, taken substantially in the plane of the line 9—9, Figure 2.

Figure 10 is a detail vertical sectional view taken substantially on line 10—10, Figure 9.

Figure 11 is a detail sectional view taken on line 11—11, Figure 9.

Figure 12 is a detail horizontal sectional view taken substantially in the plane of the line 12—12, Figure 10, certain portions being broken away to show the underlying structure.

Figure 13 is a detail vertical sectional view taken on line 13—13, Figure 8.

Figure 14 is a horizontal sectional view taken on line 14—14, Figure 13.

Figure 15 is a vertical sectional view taken on line 15—15, Figure 1.

Figures 16 and 17 are detail horizontal sectional views taken, respectively, on lines 16—16 and 17—17, Figure 15.

Figure 18 is a transverse vertical sectional view taken on line 18—18, Figure 5.

Figure 19 is a side elevation of a gauge wire adapted to be used with the lens support when testing finished lenses.

This instrument, as illustrated, comprises a main supporting frame 1 consisting of a cylindrical base member 2, a supporting ring 3 mounted on the upper end of the base 2 and a tubular standard 4 secured to the ring 3 to extend upwardly therefrom in substantially coaxial relation with the base 2. The base 2, as shown, is provided with vertically disposed slots 5 for lightness and to provide air passages for ventilating the interior thereof.

Mounted in the base 2 intermediate the ends thereof is a plate 6 which is rotatably connected with the base by a pair of pins 7 connected at diametrically opposite sides of the plate and which extend outwardly therefrom in substantially coaxial relation with each other through corresponding holes provided in the base 2, see Figure 4. To the outer end of one of the pins 7 is secured a handle 8 by which the plate 6 may be manually rotated.

An electric lamp socket 9 secured to the central portion of the plate 6 supports an incandescent lamp 10. Mounted within the upper portion of the base 2 is a cylindrical reflector 11 which surrounds the lamp 10 for directing the light rays from the lamp 10 upwardly through the interior of the standard 4. The upper side of the plate 6 may be polished so as to produce a reflecting surface adapted to cooperate with the reflector 11 for directing the light rays upwardly through the inner chamber 12 of the standard 4 substantially centrally thereof when the plate is in a horizontal position. When the plate is in a more or less angular position with respect to the horizontal the light rays are directed through the chamber 12 at an angle to the axis thereof. In other words, a light spot of relatively high intensity is produced by the coaction of the lamp 10 and the reflectors 6 and 11 on a lens carried by a lens holder 13 mounted at the upper end of standard 4 and the position of the light spot upon the lens may be readily controlled to obtain the most efficacious results by swinging the plate 6 and lamp 10.

Mounted within the chamber 12 beneath the lens holder 13 is a target 14. This target, as shown more clearly in Figures 2, 8 and 14, consists of an annular frame or ring 15 of slightly less exterior diameter than the diameter of chamber 12 so as to move freely both vertically and rotatively therein. The frame 15 is provided with a pair of guide wires 16 which extend diametrically across the frame at substantially right angles to each other. The frame 15 is rotatably mounted upon an annular support 17 which is seated in a peripheral recess 15' provided in the lower outer portion of the ring 15, as shown in Figure 13.

The support 17 has secured to one side thereof a pin or stud 18 which extends outwardly therefrom through an elongated vertically disposed slot 19 provided in the wall of the standard 4. The outer portion of the stud 18 is carried in a slide plate 20 which is mounted for vertical reciprocative movement in slot 19. The plate 20 has the opposite vertical sides thereof provided with tongues or flanges 20' which ride in corresponding grooves or recesses 21' provided in the inner adjacent vertical edges of a pair of gibs 21 secured to the outer side of the standard 4 as illustrated in Figure 8.

A shaft 22 is journaled in the upper portion of the slide plate 20, as shown in Figure 13. The inner end of the shaft 22 is provided with a pinion 23 which is in meshing engagement with rack teeth 24 provided on the upper edge surface of the frame 15. The outer end of the shaft 22 is provided with a handle 25 by which the shaft may be rotated for producing rotary movement of the frame 15 and guide wires 16 connected therewith with respect to support 17. The handle 25 may also be utilized to produce vertical movement of the plate 20 and the members carried thereby for bringing the target into proper spaced relation to a lens carried by the lens holder 13, depending upon the focal power of said lens.

In order to prevent dust or other foreign matter from passing through the slot 19 into the chamber 12, dust pads 26 may be secured, as shown in Figure 8, to the exterior surface of the gibs 21 to extend across the slot. The adjacent vertical edges of the dust pads are arranged to contact with each other substantially midway between the sides of the slot so as to permit the ready movement of an outwardly projecting rib portion 20'' of the plate 20 with respect to said pads during the vertical movement of the target.

The hereinbefore mentioned lens holder 13 comprises a transparent window or table 28 composed, in this instance, of two superposed discs of glass or the like and which is carried by an annular frame 29 mounted on the upper end of a housing member 30 secured by bolts 31 to the upper end of the standard 4, see Figures 6 and 10. The lens supporting frame 29 is provided with a pair of diametrically disposed peripheral flanges 32 which extend downwardly over the adjacent upper portion of the housing 30 and screws 33 are mounted in said flanges for engagement with the adjacent peripheral surface of the housing 30 for releasably securing the frame to said housing, as shown in Figures 6 and 9. The upper surface of the frame 29 is provided with a graduated scale 34 surrounding the upper disc of the window 28, said scale being graduated in opposite directions from a zero position to indicate progressively different degrees of a circle as shown more clearly in Figure 5.

A clamp arm 35 is mounted, as shown in Figure 5, to extend inwardly from one side of the frame 29 to substantially the center of the window 28 for releasably holding a lens on said window. The arm 35, as shown more particularly in Figure 3, is provided with a pin 36 at the outer end thereof which extends downwardly through a suitable opening provided in one of the flange members 32 of the frame 29. The lower end of the pin 36 terminates some distance below the flange 32 and is adapted to be engaged by a rock arm 37 pivotally mounted, as at 38, intermediate the ends thereof to the adjacent peripheral portion of the housing 30. The other end of the arm 37 is in the path of movement of a plunger 39 which is also slidably mounted in the flange 32.

The arrangement of the pin 36, arm 37 and plunger 39 is such that when the clamp arm 35 is in its lowermost position the plunger 39 will be maintained in its uppermost position as shown in Figure 3, and the arm 35 may be readily moved upwardly by pressure applied to the plunger 39 for releasing the lens clamped to the window thereby. The inner end of the arm 35 is provided with a segmental ring portion 40 which is adapted to align with the center of the window 28 and the axis of the chamber 12. In order that the end portion 40 of the arm may be maintained in substantially coaxial relation with the window 28 and chamber 12, the outer end portion of said arm is provided with a laterally extending foot 41 which in turn is provided with a dowel pin 42 which is slidably received in a suitable aperture provided in flange 32.

The housing 30, in this instance, is a ring-like member mounted in substantially coaxial relation with the standard 4 and is provided with an inwardly extending annular flange 44 at the lower end thereof, as shown more clearly in Figure 10. Mounted upon the flange 44 is a ring 45 which carries a translucent window 46 composed preferably of colored or stained glass adapted to receive the light from the lamp 10 therethrough. Mounted upon the ring 45 is a second ring 47 which, in turn, carries an objective lens 48 arranged over the window 46. A third ring 49 is mounted within the housing 30 over the second ring 47. This third ring carries a dial 50 composed of glass or other suitable transparent material which is adapted to receive the light from the lamp 10 passing through the window 46 and lens 48.

The upper surface of the dial 50 is provided with a graduated scale 51, as shown in Figure 6, said scale being graduated in opposite directions from a zero position at the center of the dial and in coaxial relation with the standard 4 to indicate progressively increasing values in millimeters for determining the amount of "drop" of the reading segment of the lens with respect to the optical center of said lens. It is preferable that the scale 51 be arranged, as shown in the drawings, to extend substantially normal to the axis of rotation of the reflector 6 so that the light spots produced by the coaction of lamp 10 and reflector 6 may be moved longitudinally of the scale by rocking said latter members about the axis of pin 7 to successively illuminate various portions of the scale. Each of the rings 45, 47 and 49 are preferably composed of relatively hard resilient material, such as fibre, and are provided with grooves on their inner edges for the reception of the marginal edges of the corresponding window, lens or dial member supported thereby.

Each of these rings is split at one side, as indicated more particularly in Figures 6 and 7, and is secured to the housing 30 in clamping engagement with the member supported thereby by a plurality of, in this instance four, screws 52, as indicated in Figure 6.

It will be understood that the window 46, objective lens 48 and dial 50 are arranged beneath the lens holder 13 so that the position of the reading segment on a lens mounted on said holder with respect to the center of said lens may be readily determined when looking downwardly through the lens by means of the scale 51 on the dial 50.

*Segment locator*

The upper surface of the intermediate ring member 47 is provided with a recess 54 arranged at one side thereof for the reception therethrough of a pair of guide or caliper fingers 55. These guide fingers have the inner ends thereof curved inwardly toward each other to provide points 55' arranged in opposed relation to each other and which are adapted to align with opposite sides of the reading segment of a lens mounted on the lens holder 13. These guide fingers extend outwardly through said recess 54 and through a similar recess 56 provided in the adjacent side of the housing 30 at the upper end thereof, see Figure 7.

The outer ends of the guide fingers 55 are secured by screws 57 to nut members 58 which are mounted upon a shaft 59 in screw-threaded relation therewith. The shaft 59 is rotatably mounted at the upper end of a frame 60, as shown more particularly in Figure 9, and which in turn is mounted for both rocking and lateral movement upon a bracket 61 carried by the standard 4 in a manner presently described.

The shaft 59 is provided with right and left-hand screw-threads 59' and 59'' arranged intermediate a pair of upwardly extending arms 62 of the frame 60, said screw-threads being engaged by the nut members 58, respectively. One end of the shaft 59 is extended outwardly beyond the adjacent arm 62 and has secured thereto a knurled disc 63 by which the shaft may be manually rotated. The disc 63 is provided with a relatively long hub portion 64 which extends from the disc 63 inwardly to the adjacent arm 62 of frame 60, said hub being provided with screw-threads 65 upon which is mounted a nut member 66.

The nut member 66, in this instance, is provided with a V-shaped marginal edge adapted to align with a graduated scale 67 provided on a plate 68 mounted on a bracket 69 secured to the frame 60. The marginal edge of the nut member 66 is provided with a transversely disposed recess 66' which, as shown in Figure 11, receives the adjacent portion of the scale plate 68 therein for maintaining said nut against rotation with respect to the scale plate and shaft 59 and permitting said nut to move longitudinally of the plate when the shaft 59 and screw member 64 are rotated. The scale 67 is shown graduated from 10 to 25 in Figure 7 of the drawings. These graduations are so proportioned with respect to the pitch of screw-threads 65, 59' and 59'' as to indicate the distance in millimeters the points 55' of the guide fingers 55 are spaced from each other.

The manner of connecting the frame 60 with the bracket 61, in this instance, consists in providing the bracket with a horizontally disposed hole 70 in which is mounted a pair of supporting pins 71 and 72. The pin 71 is secured to the bracket 61 by a screw 73 and extends outwardly from one end of the hole 70 through a suitable opening provided in the adjacent one of a pair of downwardly extending arms 74 of the frame 60. The pin 71 is slidably and rotatably received in the opening in the frame arm so that the frame is free to move longitudinally of the pin and to rock about said pin as a pivot. The pin 72 has one end rotatably and slidably mounted in the portion of the hole 70 unoccupied by the pin 71. Pin 72 extends outwardly from the hole 70 through a suitable aperture provided in the lower end of the second arm 74 of the frame 60 and is secured to said arm, as by a pin 75, so as to move in unison therewith.

The outer end of the pin 72 has a lever 76 pivotally connected thereto, as at 77, a short distance above the lower end of the lever. The lever extends some distance above the pivot 77 and is provided with a finger ring 78 whereby the lever may be manually rocked toward or from the bracket 61. The lower end of the lever 76 is pivotally connected, as at 76', to one end of a link 79 which extends substantially parallel with the pin 72 through a slot 74' provided in the lower end of the arm 74 connected with the pin 71 and is slidably supported in said slots by a screw 80. The end of the link 79 adjacent the slot 74' is bent upwardly and received in an annular groove 81 provided in the periphery of the fixed rod 71 adjacent the outer end thereof.

It will now be observed that inasmuch as the pin 71 is held against movement with respect to the bracket 61 rocking of the lever 76 about the pivot 76' from the intermediate position indicated by full lines in Figure 9 to one or the other of the extreme positions, as indicated by the broken lines X, will produce a corresponding lateral movement of the frame 60 and, therefore, of the guide fingers 55 carried thereby.

Furthermore, it will be observed that due to the connection of the lever 76 with the pin 72, the frame 60 may be rocked about the axes of the pins 71 and 72 to move the upper portion of the frame toward or from the housing 30. This swinging movement of the frame toward and from the housing will produce a corresponding movement of the guide fingers 55 from a position substantially in alignment with the center of the dial 50 outwardly toward the edge of said dial or vice versa. This latter movement of the frame 60 and the guide fingers is for the purpose of arranging said fingers at one side or the other of the vertical plane passing through lens holder 13 at the 0–180° position on the scale 34 for determining the amount of drop of the reading segment of the lens.

In order that the amount of inset or outset of the guide fingers may be readily determined, I have provided an index plate 83 which is mounted over a chart 84 carried in substantially a horizontal position by a plate 85 secured to the housing 30 by screws 86 to project outwardly therefrom in a plane over the guide fingers 55. The index plate 83 is secured by a screw 87 to a slide plate 88 mounted in a horizontal plane intermediate the guide fingers and the plate 85 to slide between a pair of guide rails 89 secured to plate 85, as shown in Figures 10 and 12.

The slide plate 88 is provided with a boss 88' which extends upwardly therefrom through an elongated slot 85' provided in the plate 85 and chart 84 into a shallow recess provided in the lower face of the index plate 83, the screw 87 being screw-threaded in said boss. The lower side of the slide plate 88 is provided with a groove or recess 90 extending longitudinally thereof from front to rear and which receives therein the upper end of a pin 91 clamped to the frame 60 by the bracket 69.

It will now be seen that when the frame 60 is moved laterally a corresponding lateral movement of the index plate 83 will be produced thereby through the medium of the pin 91. During the rocking movement of the frame 60, however, the index plate 83 will remain stationary due to the movement of the pin 91 through the groove or recess 90. In order that the amount of lateral movement of the index plate 83 may be readily determined, the chart 84 is provided with two graduated scales 92 on the upper surface thereof comprising parallel lines adapted to align with the longitudinal edges 83' of the index plate. The distance from the exterior side of one scale 92 to the exterior side of the other scale 92 is substantially equal to the width of the index plate 83 so that when said index plate and the guide fingers 55 are in their central position, said edges 83' of the plate will register with the outer positioned lines of the corresponding scale 92, as indicated in Figure 5.

The lines of each scale 92 are arranged, in this instance, substantially one millimeter apart so that when the index plate is moved laterally in either direction, the amount of said movement may be readily determined by the alignment of an edge 83' of the index plate with said scales, the edges 83' being beveled to render the reading to be quickly and accurately made.

The bracket 61 may be mounted on the standard 4 in any suitable manner. However, in order to provide for lateral adjustment of the bracket, I have shown the same secured by screws 93 to a slide 94 mounted on a block 95 secured to the standard 4, as shown in Figure 10. The guide block is provided with a dovetail tongue or flange 95' which is slidably received in a corresponding dovetail recess 94' provided in the inner face of the slide 94.

A wear plate 96 is mounted between the lower edge of the flange 95' and the adjacent side of the recess 94'. The slide 94 is releasably clamped to the block 95 by screws 97 mounted in the lower portion of said slide for urging the wear plate 96 into frictional contact with the adjacent surface of the block 95.

*Marking mechanism*

Connected with the housing 30 at the side thereof opposite the segment locating mechanism is a shelf or extension 98 to which is secured a bracket 99. This bracket 99 is provided with an extension 99' which projects rearwardly and supports an inkwell 100. The inkwell 100 may be rotatably connected with the extension 99', as shown in Figure 18, so that the position thereof with respect to the marking elements may be changed.

A carrier frame 101 is rotatably connected at one end to a shaft 102 fixedly secured in suitable bearing members 103 provided on the bracket 99 to swing about a horizontal axis at right angles to the longitudinal center of the standard 4. The opposite end of the frame 101 is bifurcated and provided with transversely spaced coaxial bearing pins 104 arranged substantially parallel with the bearings 103. The inner ends of the bearing pins 104 project toward each other for supporting a ring-shaped housing 105 which is secured to the inner ends of the bearing pins by screws 106, Figure 18, or equivalent fastening means, the pins being engaged in diametrically opposed radial openings in said housing.

The outer end of one of the bearing pins 104 has secured thereto a circular disc or pulley 107. A similar disc or pulley 108 is secured to the shaft 102 in alignment with the pulley 107. The pulleys 107 and 108 are connected to each other by a flexible metal strap or belt 109 secured to the pulleys, as by screws 110, so that the pin 104 and the housing 105 connected thereto will be maintained against rotation with respect to the shaft 102 and the housing member 30 when the frame 101 is swung about the shaft 102 as an axis. In other words, the housing 105 is maintained in substantially a horizontal plane in all positions of the swinging frame 101. The shaft 102 is positioned substantially midway between the inkwell 100 and the lens holder 13 so that as the frame 101 is moved from its outermost position to its innermost position the housing 105 will be moved from a position over the inkwell 100 to a position over the window 28 of the lens holder 13 or vice versa.

In order that the frame 101 may be readily moved about the shaft 102, said frame is provided with a handle 111 secured to the outer end of the frame opposite the pulley 107. The upper surface of the housing 105 is provided with diametrically opposed series of graduations 112 gradually increasing in value from zero at one side to 180° at the opposite side. One set of graduations is used to indicate the degree of angular adjustment of the marking pins presently described from the zero position for marking on a convex surface as when the eye-side of a lens is placed facing down and the other set for marking upon a concave surface as when the eye-side of a lens is placed facing up.

A circular tool-supporting block 113 is journaled for rotary movement within and upon the housing 105 substantially coaxial therewith and is held against axial displacement by an upper shoulder 114 provided on said block and seated in a corresponding recess in the upper inner edge of the housing 105 and a pair of screws 115 screw-threaded in the lower portion of the block at diametrically opposite sides thereof, the heads of said screws being arranged in overlying relation with the adjacent lower surface of the housing 105. The tool supporting block 113 may be readily removed from the housing 105 when desired by simply removing the screws 115. This block 113 is provided with a central coaxial socket 116 and similar additional sockets 116' extending radially from the central socket and also circumferentially about the block in slightly inward spaced relation to the peripheral edge thereof. The sockets are all arranged in parallel relation with each other and open from the under side for receiving a corresponding number of marking pins 117 and 117' which are similarly arranged in parallel relation in their respective sockets.

The upper ends of the pins 117 and 117' are reduced in diameter and extend through corresponding reduced openings in the upper end walls of the sockets to permit vertical movement of the pins, said pins being maintained, in this instance, in their lowermost position by gravity. The upper reduced ends of the marking pins are provided with screw-threaded apertures for receiving suitable screws 118 having heads 118' adapted to engage the upper face of the tool block for limiting the downward movement of the pins and also for setting the marking pins so that their lower marking points will be normally disposed in approximately the same horizontal plane. The object of this movably mounting the marking pins in the holder block 113 is to permit their points to conform to the contour of the lens blank during the marking operation and also to permit the marking points to contact substantially uniformly with the inking pad, as 119, mounted in the inkwell 100. The holder or block 113 is provided with diametrically opposite index lines 120 adjacent the periphery thereof and in alignment with the radially disposed row of marking pins to register with any one of the graduations 112 on the upper face of the housing 105, as the holder is rotated, thus permitting the diametrically disposed marking pins to be positioned to any desired angle for marking the optical centers and axes upon the lens blank according to certain prescribed formulae required for the finished lenses. The angular adjustment of the holder is effected by hand and for this purpose two of the screw-heads, as 118', positioned at diametrically opposite sides of the block, may be arranged as illustrated in Figure 18 to extend some distance above the upper face of the supporting block when the pins are in their lowermost position to provide fingerpieces whereby the block may be manually rotated.

As before stated, the diametrically disposed marking pins are for the purpose of marking the optical center and axes upon the lens blank, while the pins disposed about the axis of the center pin adjacent the periphery of the block are for marking the lens at corresponding points to be used for gauging the thicknesses of the lens at these points so as to avoid the formation of prisms during the grinding operation.

The rotation of the supporting block 113 to properly position the marking pins 116 and 116' for marking the optical center and axis upon the lens blank is usually accomplished when the frame 101 is in its outermost position with the marking pins in engagement with the ink pad carried by the inkwell. It will, therefore, be observed that another purpose of rotatably mounting the inkwell upon the bracket 99 is to permit the inkwell to rotate in unison with the block and pins during this angular adjustment of the pins.

Eye-piece

In order to assist the operator in properly positioning a lens upon the lens holder, I have provided this instrument with an eye-piece 122 which, as shown more particularly in Figures 2 and 15, is a hollow, frusto-conical shaped member open at the bottom and having a peep aperture 123 provided in the upper end wall thereof. The eye-piece 122 is secured to an arm 124 which has an upper horizontal portion extending outwardly from the eye-piece and a substantially vertical portion extending downwardly from the horizontal portion.

The lower vertical portion of the arm extends through a bracket 125 secured to a laterally projecting shelf 126 formed on the standard 4 at one side thereof. The arm 124 is mounted in the bracket 125 for vertical adjustment and in order to frictionally maintain the arm in the adjusted position, I have provided the bracket with a spring-pressed key 127, see Figures 15 and 17, which normally rides in a vertically disposed groove 128 provided in the peripheral surface of the arm 124 at one side thereof. This key 127 is maintained against vertical movement by a screw or pin 129 mounted in the bracket 125 adjacent the lower end thereof, the inner end of said screw or pin being seated in a recess provided in the adjacent portion of the key.

The groove 128 and the adjacent inner side of the key 127 are V-shaped in cross section, as illustrated in Figure 17, so that said key functions to maintain the arm 124 against rotary movement. A fingerpiece, as 130, may be secured, as shown in Figure 15, to the lower end of the arm 124 to extend downwardly some distance below the bracket 125 whereby the arm and eye-piece 122 may be readily moved vertically. The downward movement of the arm and eye-piece 122 is limited by a stop stud 131 mounted in the arm 124 above the bracket 125 and which is adapted to engage the upper end of a stop pin 132 secured in the upper end of the key 127. The arm 124 may also be adjusted vertically by means of a pinion 133 mounted on a shaft 134 journaled in suitable bearings 135 provided on the bracket 125, said pinion having meshing engagement with rack teeth 136 provided in the peripheral surface of the arm 124 at one side of the groove 128. One end of the shaft 134 extends beyond the bracket 125 and is provided with a knurled disc 137, see Figure 1, by which the shaft and pinion may be manually rotated.

As a further means for assisting the operator in locating and testing the lens, I have provided an incandescent lamp 138 which is mounted in a lamp socket 139 secured to the upper end of a substantially L-shaped rod 140 which in turn has the lower end thereof rotatably connected with the bracket 125 to be supported thereby. The lamp 138 is arranged to swing in a horizontal plane above the frame 101 and may, as shown, be provided with a reflector 141 mounted on the socket 139 for directing the rays of light from said lamp upon the lens or inkwell as may be desired.

As a further aid for the operator, I have provided the eye-piece 122 with a magnifying glass 143 which is mounted in a case 144 pivotally connected by a screw 145 with the arm 124 adjacent the eye-piece 122. The case 144 is mounted to swing in a horizontal plane beneath the eye-piece 122 from a position in coaxial alignment with the peep aperture 123 to a position at one side of the eye-piece out of the line of vision of the operator when sighting through the eye-piece.

Operation

When marking a semi-finished bi-focal lens, there are at least three factors to be determined in accordance with a predetermined prescription, namely, the desired position of the optical center of the lens with respect to the "drop" of the reading segment, the position of this center with relation to the inset or, in certain instances, the outset of the reading segment and the angle of position of the cylindrical axis.

These factors being determined, the instrument is adjusted accordingly by first moving the guide fingers 55 to the right or to the left, if they are not already in their proper position, by swinging the lever 76 toward or from the frame 60 until an edge 83' of the index plate 83 is aligned with the proper line of a scale 92. The scale 92 arranged adjacent the right-hand edge of the index plate 83 is used for a lens positioned with the eye-side up when wishing to determine the right eye inset or the left eye outset, and when the lens is positioned with the eye-side down for the left eye inset or the right eye outset. The scale 92 adjacent the left-hand edge of the index plate 83 is used when the lens is positioned with the eye-side up to determine the left eye inset or the right eye outset, or if the lens is positioned with the eye-side down to determine the right eye inset or the left eye outset, as indicated in Figure 5. The guide fingers may then be adjusted toward or from each other to bring the points 55' thereof spaced from each other a distance equal to the width of the reading segment. The supporting block 113 of the marking mechanism may then be adjusted, when necessary, with respect to the housing 105 to bring the index line 120 along its scale 112 to one side or the other of the zero graduation so as to register with the graduation corresponding to the prescribed angle of inclination of the cylindrical axis of the lens to the horizontal axis or mounting line.

The lens to be marked may now be mounted on the lens holder 13 beneath the inner end 40 of the clamp 35, the lens is usually placed with the convex or finished side thereof uppermost. The lamp 10 may now be energized in any convenient manner and the eye-piece 122 adjusted vertically so as to enable the operator to see most clearly through the lens and standard chamber 12.

When a finished lens is to be marked, the lamp 10 is adjusted by swinging handle 8 about the vertical position for obtaining the maximum illumination of the reading segment of the lens and illuminate the target cross wires 16. When a bi-focal lens is to be marked, the lamp may be tilted with respect to the vertical so as to eliminate glare. The target 14 may now be adjusted vertically by up or down movement of the handle 25 to the required axis for the focal power of the lens. The target may then be adjusted angularly by rotation of the handle 25 to bring one or the other of the cross wires 16 into alignment with the 0–180° line or any other required degree line on the scale 34.

The lens may now be adjusted with respect to the window 28 of the lens holder to bring the upper edge of the reading segment the required distance below the optical center of the lens, as determined by the scale 51 on the dial 50. That is, to bring the upper edge of the segment into alignment with the graduation on the scale 51 corresponding to the amount of "drop" called for in the prescription. At the same time, the lens is adjusted so as to bring the side edges of the segment into alignment with the corresponding points 55' of the guide fingers 55 to obtain the required inset or, in certain instances, outset of the reading segment as called for in the prescription.

The marking device is then rocked about the axis of shaft 100 to bring the marking pins 116 and 116' from the inoperative position in engagement with the ink pad to the operative position into engagement with the upper surface of the lens blank for marking the optical center of the lens and the position of the cylindrical axis with respect to the reading segment. The lens blank, after being marked, may be removed from the marking machine and placed upon the lap of a suitable grinding and polishing machine with the marked axis registered with the axial length of the lap, the unfinished surface of the lens blank being then ground and polished to the required contour such as, for example, a cylindrical surface for producing a toric lens.

After the lens has been ground, the accuracy of the grinding operation may be readily determined by my novel instrument by again placing the lens upon the window 28 of the lens holder with the convex side uppermost and with the reading segment positioned between the points 55' of the guide fingers 55 and at a distance below the center of the scale 51 corresponding to the amount of "drop" of the segment called for in the prescription.

Now, by rotating the target 14 until the cross wires 15 appear unbroken throughout their length at the edges of the lens to determine the actual major and minor axes of the lens produced by the grinding operation, the degree of accuracy of the grinding operation may then be readily determined by observing the position of the cross wires of the target, as indicated by the scale 34 provided on the lens support. The cutting or base line of the lens may now be readily marked on the lens by moving the supporting block 113 with respect to the housing 105 to bring the index lines 120 into registration with the line 0–180° line on the scale 112, after which the frame 101 may be rocked forwardly to bring the marking pins into contact with the upper surface of the lens.

When it is desired to test the accuracy of the grinding of the finished lenses, a wire 147, Figure 19, may be inserted in apertures 146 provided in the disc 29 of the lens holder, as illustrated by broken lines in Figure 5, so as to extend across the center of the lens holder window 28 to designate the horizontal axis of the lens.

My novel lens marking, centering and testing instrument may also be readily used for marking prisms. When it is desired to use the instrument in this manner the outer glass 28' of the window 28 may be removed and another glass inserted having a supplemental prism graduated scale provided thereon.

Although I have shown and particularly described the preferred embodiments of my invention, I do not wish to be limited to the exact construction shown as various changes in the form and relation of the parts thereof may readily be made without departing from the spirit of the invention as set forth in the appended claims.

I claim:

1. In a segment selector for bifocal lenses, a support having means associated therewith for holding a lens, a pair of caliper elements, carrier means for maintaining said caliper elements in cooperative relation with a lens supported by said lens holding means so as to have longitudinal and transverse movements with respect to said lens, said carrier means including a frame mounted on the support at one side of the lens holding means to reciprocate in either of two directions at substantially right angles to each other, means operably connecting the caliper elements to said frame, means for moving said frame in both said directions of movements thereof, including a single lever and mechanism connecting said lever to the frame and support of such a character that the lever moves in unison with the frame when moving said frame in one of said directions and relative to said frame and support when moving said frame in the other of said directions, and scale and pointer means connected directly to the frame and support rendered effective by said movements of said frame for indicating the degree of said longitudinal and transverse movements of the caliper elements.

2. In a segment locator for bifocal lenses, a support having means associated therewith for holding a lens, a pair of caliper elements, carrier means for maintaining said caliper elements in cooperative relation with the lens supported by said lens holding means so as to have longitudinal and transverse movements with respect to said lens, said carrier means including a frame mounted on the support at one side of the lens holding means to reciprocate in either of two directions at substantially right angles to each other, adjustable means connecting the caliper elements to said frame including a pair of relatively movable supports, means including a single lever connected with the frame to move in unison therewith in one of said directions of movement of the frame and having pivotal connection with said frame and with the support for moving said frame in both said longitudinal and transverse movements thereof, scale and pointer means connected directly to the frame and support rendered effective by said movement of said frame for indicating the degree of said longitudinal and transverse movements of the caliper elements, and means mounted on the frame independently of the support including a fixed scale, a rotatable screw operatively connected with said pair of movable supports, and a pointer screw-threaded on the screw and slidably associated with said scale for producing relative movement of the caliper elements toward and from each other independently of said longitudinal and transverse movements thereof and for indicating the degree of said relative movement.

3. In a lens testing instrument of the character described, a lens holder, a source of light mounted to be substantially in the optical axis of a lens carried by said lens holder, a target interposed between the lens holder and said source of light, a reflector associated with said source of light for reflecting light rays on the target and a lens carried by said lens holder, said reflector being angularly movable to concentrate light spots from said optical axis to one side thereof, and means providing a graduated scale adjacent the lens holder, said scale extending in the direction of movement of said light rays produced by said angular movement of said reflector to be successively illuminated by said light rays.

4. In a lens testing instrument of the character described, a reflecting tube, a lens holder and a source of light connected with the reflecting tube in spaced relation with respect to each other axially of said tube, a substantially flat reflector angularly movable to concentrate light spots off the tube axis, and means providing a graduated scale at the end of the tube adjacent the lens holder, said scale being extended in the direction of movement of the light spots to have successive portions thereof illuminated during said angular movement of said reflector.

5. An instrument for centering, marking and testing lenses comprising in combination, a supporting member, a lens holder and a source of light connected with the supporting member in spaced relation with respect to each other, a target carried by said supporting member intermediate the lens holder and said source of light, reflector means associated with said source of light for reflecting light rays on the target and on a lens carried by said lens holder, said reflector means including a substantially flat disk connected with said source of light to support the same, said disk being mounted to rock about a fixed axis, means for rocking said disk about said axis to vary the concentration of light spots with respect to the lens, and means providing a lineal graduated scale adjacent the lens holder for determining the position of at least a portion of the lens, said scale being extended in a direction substantially normal to said axis of pivotal movement of the reflector to have successive portions thereof illuminated during said pivotal movement of said reflector.

6. In a lens centering, marking and testing instrument, a reflecting tube, a lens holder and a source of light connected with the reflecting tube in spaced relation with respect to each other axially of said tube, a target mounted in said tube intermediate the lens holder and said source of light to be illuminated by rays of light from said light source, a pair of caliper elements mounted adjacent the lens holder for longitudinal and transverse movements with respect to the lens holder to determine the location of the reading segment of a bifocal lens carried by said lens holder, a reflector associated with said source of light for reflecting light rays on the target, caliper elements and said lens carried by said lens holder, said reflector being mounted to swing about a fixed axis extending substantially normal to the longitudinal movement of said caliper elements of such a character that light rays may be successively concentrated on the lens in a direction parallel with the longitudinal movement of said caliper elements upon pivotal movement of said reflector.

WILLIAM A. LOCKHART.